(12) United States Patent
Blake et al.

(10) Patent No.: US 8,832,008 B2
(45) Date of Patent: Sep. 9, 2014

(54) TECHNIQUES FOR REAL-TIME CUSTOMER PREFERENCE LEARNING

(75) Inventors: Norman Perkins Blake, Zionsville, IN (US); Vincent Robert Koser, West Lafayette, IN (US)

(73) Assignee: NCR Corporation, Duluth, GA (US)

( * ) Notice: Subject to any disclaimer, the term of this patent is extended or adjusted under 35 U.S.C. 154(b) by 328 days.

(21) Appl. No.: 13/331,291

(22) Filed: Dec. 20, 2011

(65) Prior Publication Data
US 2013/0159224 A1 Jun. 20, 2013

(51) Int. Cl.
G06F 15/18 (2006.01)
(52) U.S. Cl.
USPC .......................................................... 706/20
(58) Field of Classification Search
USPC .......................................................... 706/12
See application file for complete search history.

(56) References Cited

U.S. PATENT DOCUMENTS

| | | | | |
|---|---|---|---|---|
| 6,128,624 A | * | 10/2000 | Papierniak et al. | 1/1 |
| 6,151,584 A | * | 11/2000 | Papierniak et al. | 705/7.32 |
| 6,151,601 A | * | 11/2000 | Papierniak et al. | 1/1 |
| 7,797,453 B2 | * | 9/2010 | Meijer et al. | 709/246 |
| 8,373,330 B2 | * | 2/2013 | Diamond | 310/316.01 |
| 2010/0205045 A1 | * | 8/2010 | Zhang et al. | 705/10 |

* cited by examiner

*Primary Examiner* — Michael B Holmes
(74) *Attorney, Agent, or Firm* — Joseph P. Merhle

(57) ABSTRACT

Techniques for real-time offer customer preference learning are presented. Local agents on communication channels are equipped with predefined rules that capture actions and behaviors of customers interacting with an enterprise. The metrics associated with these actions and behaviors are plugged into the rules and in some cases combined with known pre-existing preferences for the customers for purposes of evaluating the rules and creating newly learned preferences for the customers. The newly learned preferences are dynamically fed into offer evaluation processing to determine whether to make offers to the customers.

20 Claims, 3 Drawing Sheets

TECHNIQUES FOR REAL-TIME CUSTOMER PREFERENCE LEARNING

BACKGROUND

Consumers are increasingly using automated mechanisms to perform every day transactions. Kiosks exist to avoid enterprise personnel and lines. These automated kiosks allow consumers to perform transactions with an enterprise or agency with little to no human intervention. Individuals also perform transactions online and are capable of using their smart phones to check out of stores.

Consequently, information about a specific consumer and that consumer's preferences and habits are becoming harder and harder to ascertain. Recently, advancements have permitted a centralized consumer preference database. This allows preferences of any particular consumer to be captured from a variety of channels (in-person communication, cell communication, web communication, in-store communication, home phone communication, kiosk communication, and the like). Such advancement is significant because preferences of a consumer on one communication channel may different with that of another communication channel.

However, this centralized enterprise preference system is still mostly a collection system. That is, preferences gathered are made available across channel communications but the preferences are collected and not computed in real time. So, preferences are not capable of being learned or dynamically altered based on actions taken by consumers over one or more communication channels.

As a result and for the most part, preference processing is not truly up-to-date and is not presently capable of being altered based on actual customer behavior across communication channels with an enterprise.

SUMMARY

In various embodiments, techniques for real-time customer preference learning are presented. According to an embodiment, a method for real-time customer preference learning is discussed.

Specifically, a customer is identified as engaging in an interaction with the device. Next, predefined rules that are pertinent to preference determination for preferences of the customer are obtained and actions of the customer are gathered during the interaction. The metrics for the actions are then fed to the predefined rules. Finally, the predefined rules are evaluated using the metrics to learn a new preference to assign to the customer or to update an existing preference value for an existing preference based on evaluation of the predefined rules.

DETAILED DESCRIPTION

Figure 1:
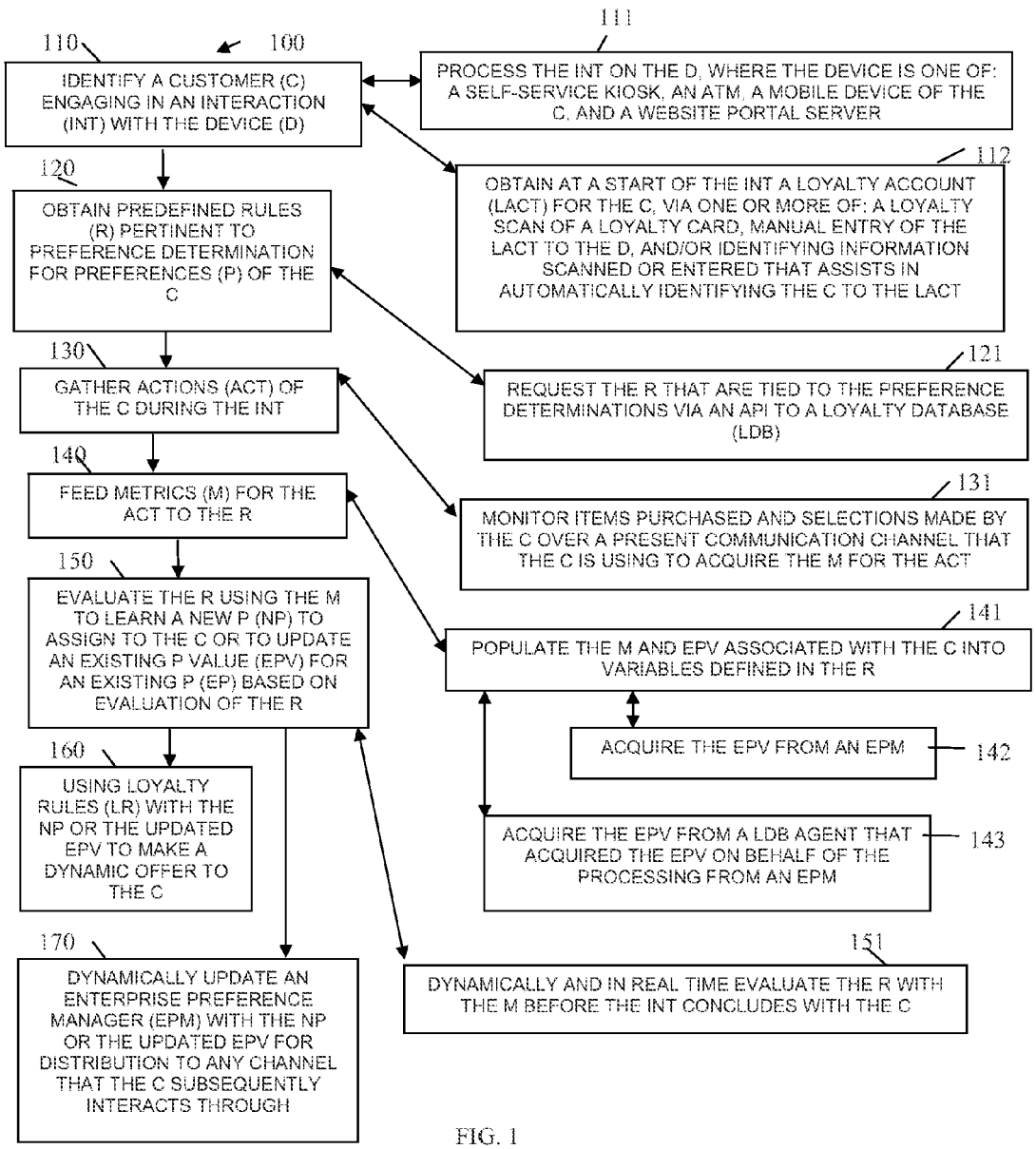
FIG. 1 is a diagram of method for real-time customer preference learning, according to an example embodiment.

The aforementioned industry problems are resolved by deploying pre-defined rules into loyalty processing agents on channels that a customer interacts with an enterprise with. These predefined rules capture actions and behavior of the customer and trigger new preferences or updated preferences based on the customer's actions on a specific channel. So, the rules are acted upon in real time and create preference choices for a customer on-the-fly based on the customer's behavior while interacting with a specific channel.

It is noted that as used herein "offer" is to include such things as, coupons, loyalty points, reward certificates, discounts, and the like.

Also, a "channel" refers to a communication medium with which the customer interacts with an enterprise. This can be a variety of things, such as but not limited to: in-person communication with an agent of an enterprise where the agent enters attributes into an enterprise terminal device for the communication; cell phone communication; Blue tooth communication; Radio Frequency (RF) communication, Near Field Communication (NFC), web-based communication, kiosk-based communication, and the like.

Moreover, the techniques herein integrate in real time an enterprise preference manager (EPM) system with enterprise loyalty systems (CRM systems) at a point of contact with a customer and over any type of communication channel that utilizes the CRM systems. An example EPM system is entitled: "Centralized user Preference Management for Electronic Decision Making Devices," filed on Oct. 29, 2010 as U.S. patent Ser. No. 12/915,235, commonly assigned to NCR, Inc. of Duluth, Ga., and the disclosure of which is incorporated by reference herein and below.

As will be demonstrated more completely herein and below, the act of a customer performing actions on a specific channel can identify that customer as having a particular preference based on predefined rules. These rules are then acted upon in real time and used for creating preference choices for a customer on-the-fly based on the customer's behavior while interacting with the channel.

For example consider the following use case scenario (used for purposes of illustration and comprehension and to demonstrate one aspect of the techniques presented herein and below):

Suppose an enterprise sets up a predefined rule that states anyone (any customer) buying 10 bags of any type of dog food will have an automatic preference created for them of "Pet Owner=True" and also "Pets Owned=Dog."

A subsequent promotion can be setup (within the enterprise Customer Relationship Management (CRM) system) that grants 10% off of all dog food, when a customer purchases dog food and has a preference value of "Pets Owned=Dog."

The above preferences and resultant value choices are all created in an enterprise software system and acted upon from any channel. Any combination of preferences and values can then be leveraged for the condition or reward of an offer allowing for the creation of infinite complex scenarios of automatically real-time learned preferences and promotions based on those preferences. When learning a preference, the learned preference can be acted upon in a current channel interaction or acted upon in any future interaction on any other channel where the customer can be identified.

It is within this initial context that various embodiments of the invention are now presented and discussed below with reference to the FIGS. 1-3.

FIG. 1 is a diagram of method 100 for real-time customer preference learning, according to an example embodiment. The method 100 (hereinafter "client loyalty preference agent") is implemented as instructions and programmed within a non-transitory computer-readable (processor-readable) storage medium that executes on one or more processors of a device (such as a mobile device, enterprise terminal device, and the like), the processors of the device are specifically configured to execute the client loyalty preference agent. The client loyalty preference agent may is also operational over a network; the network is wireless or a combination of wired and wireless. In an embodiment, the network is the Internet, a Wi-Fi network, a cellular network, a Bluetooth network, a satellite network, a closed and private Wide-Area Network (WAN), an Ethernet network, a Local-Area Network (LAN), other types of networks, or the network is a combination or all of these networks.

The processing of the client loyalty preference agent is presented from the perspective of an agent that processes as an application on a device that a consumer uses to transact with an enterprise.

As used herein the terms "consumer," "customer," and "user" may be used interchangeably and synonymously with one another.

At 110, the client loyalty preference agent identifies a customer engaging in an interaction a device of an enterprise. The engagement can occur in a variety of manners, such as directly actions of the customer on the device or such as via enter information into the device by personnel of the enterprise. The interaction occurs over a specific communication channel between the customer and the enterprise. The enterprise provides a variety of channels for the customer to interact with the enterprise.

According to an embodiment, at 111, the client loyalty preference agent processes the interaction on the device, where the device is one of: a self-service kiosk, an Automated Teller Machine (ATM), a mobile device of the customer (e.g., laptop, phone, tablet, etc.), and a website portal server of the enterprise.

In another situation, at 112, the client loyalty preference agent obtains at a start of the interaction a loyalty account for the customer. This loyalty account is obtained, via one or more of: a loyalty scan of a customer's loyalty card, manual entry of the loyalty account into the device by the customer or personnel of the enterprise, and/or identifying information scanned or entered into the device that assists in automatically identifying the customer to the loyalty account.

At 120, the client loyalty preference agent obtains predefined rules pertinent to preference determination for preferences of the customer. These predefined rules can be specific to marketing campaigns, manufactures, retailers, types of goods, and others. Analysts use separate interfaces to communicate the predefined rules to a loyalty database. Moreover, in some instances, the predefined rules can be hierarchical in nature and depend on other rules.

In an embodiment, at 121, the client loyalty preference agent requests the predefined rules that are tied to the preference determinations via an Application Programming Interface (API) to a loyalty database of the enterprise.

At 130, the client loyalty preference agent gathers actions of the customer during the interaction.

So, in one instance, at 131, the client loyalty preference agent monitors items being purchased and selections being made by the customer of a present communication channel with the enterprise during the interaction. The monitoring provides the metrics, such as identification of goods, identification of manufacturers, identification of channel being used, identification of enterprise, identification of number of goods purchased, identification of time of day and date, identification of geographical location, and the like.

At 140, the client loyalty preference agent feeds the metrics for the actions to the predefined rules. That is, variables applicable to the rules are populated with the corresponding metric values to evaluate the predefined rules.

In an embodiment, at 141, the client loyalty preference agent populates the metrics and existing preference values known for the customer into variables defined in the predefined rules. So, known preferences for the customer are used as well in the evaluation.

Continuing with 141 and at 142, the client loyalty preference agent acquires the existing preference values from an enterprise preference manager.

Still continuing with 141 and at 143, the client loyalty preference agent acquires the existing preference values from a loyalty database on behalf of the client loyalty preference agent and from an enterprise preference manager.

At 150, the client loyalty preference agent evaluates the predefined rules using the metrics to learn a new preference to assign to the customer or to update an existing preference value for an existing preference and based on evaluation of the predefined rules.

According to an embodiment, at 151, the client loyalty preference agent dynamically and in real time evaluates the predefined rules with the metrics before the interaction concludes with the customer.

In one scenario, at 160, the client loyalty preference agent uses loyalty rules with the new preference or the updated existing preference values to make a dynamic offer to the customer before the interaction between the customer and the enterprise concludes over the present channel.

In another case, at 170, the client loyalty preference agent dynamically updates an enterprise preference manager with the new preference or the updated enterprise preference values for distribution to any channel that the customer subsequently interacts through with the enterprise.

It may even be the case that a new offer based on the new preference or updated existing preference values generate the new offer as being presented at a later date on a specific communication channel to the customer.

Figure 2:
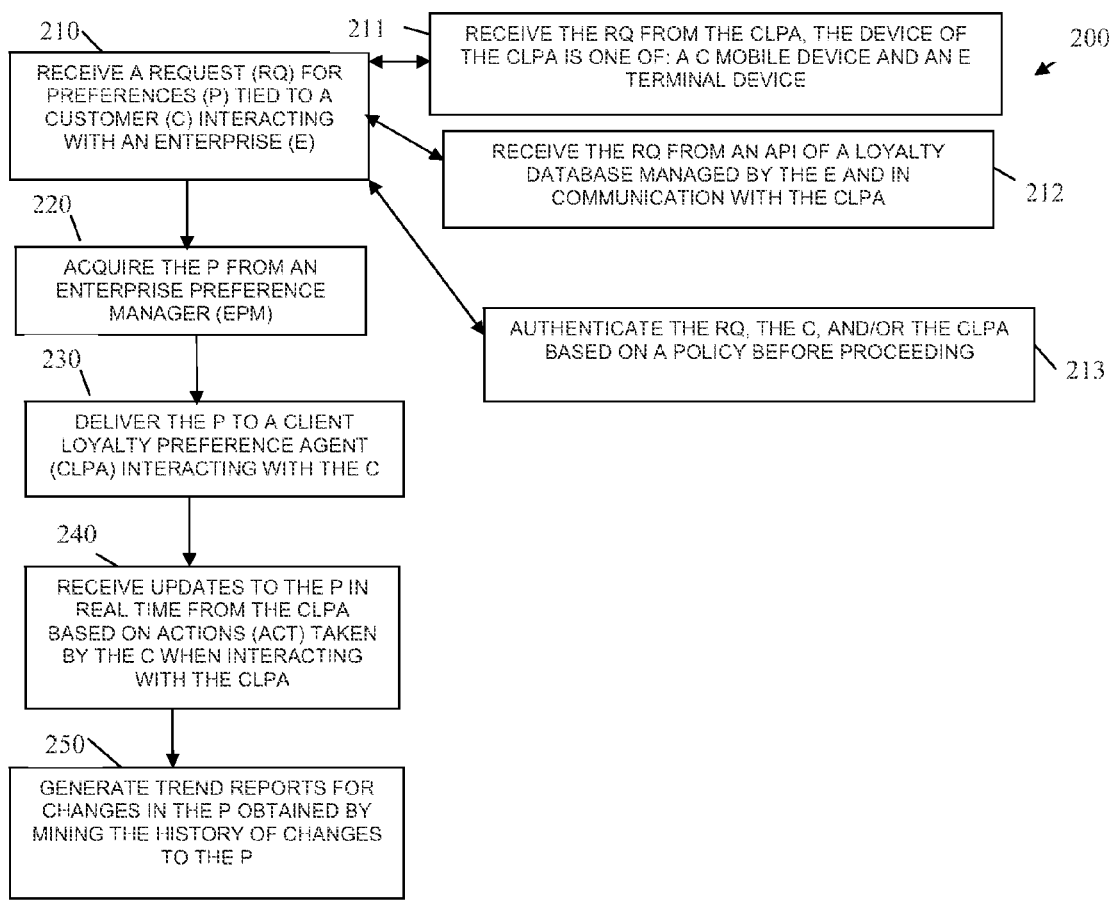
FIG. 2 is a diagram of another method for real-time customer preference learning, according to an example embodiment.

FIG. 2 is a diagram of another method 200 for real-time customer preference learning, according to an example embodiment. The method 200 (hereinafter "preference learning agent") is implemented as instructions and programmed within a non-transitory computer-readable (processor-readable) storage medium that executes on one or more processors of a server (such as a cloud processing environment), the processors of the server are specifically configured to execute the preference learning agent. The preference learning agent is operational over a network; the network is wireless or a combination of wired and wireless. In an embodiment, the network is the Internet, a Wi-Fi network, a cellular network, WAN, LAN, Ethernet network, a Bluetooth network, other types of networks, a satellite network, or the network is a combination or all of these networks.

In an embodiment, the preference learning agent describes processing actions from the perspective of a specific server that is interacting with the client loyalty preference agent described above with reference to the FIG. 1. So, in an embodiment, the preference learning agent interacts with the client loyalty preference agent represented by the method 100 of the FIG. 1 and discussed in detail above.

In an embodiment, the preference learning agent is an enhancement to an EPM, such as the EPM discussed above and incorporated by reference herein.

At 210, the preference learning agent receives a request for preferences tied to a customer interacting with an enterprise over a specific communication channel. It is noted that some of all the available preferences may not be applicable to the customer when the customer is using the specific communication channel. The applicable preferences based on the specific communication channel are resolved by the preference learning agent.

According to an embodiment, at 211, the preference learning agent receives the request from a client loyalty preference agent, such as the client loyalty preference agent discussed above with reference to the method 100 of the FIG. 1. The device of the client loyalty preference agent is one of: a customer's mobile device and an enterprise terminal device.

In another case, at 112, the preference learning agent receives the request from an API of a loyalty database managed by the enterprise and in communication with the client loyalty preference agent.

In yet another situation, at 113, the preference learning agent authenticates the request, the customer, and/or the client loyalty preference agent based on policy before proceeding.

At 120, the preference learning agent acquires the preference from an enterprise preference manager, such as the enterprise preference manager discussed above and incorporated by reference herein.

At 230, the preference learning agent delivers the preferences to the client loyalty preference agent, which is interacting on behalf of the enterprise with the customer.

At 240, the preference learning agent receives updates to the preferences in real time from the client loyalty preference agent based on actions taken by the customer when interacting with the client loyalty preference agent.

According to an embodiment, at 250, the preference learning agent generates trend reports for changes in the preferences obtained by mining the history of changes to the preferences.

Figure 3:
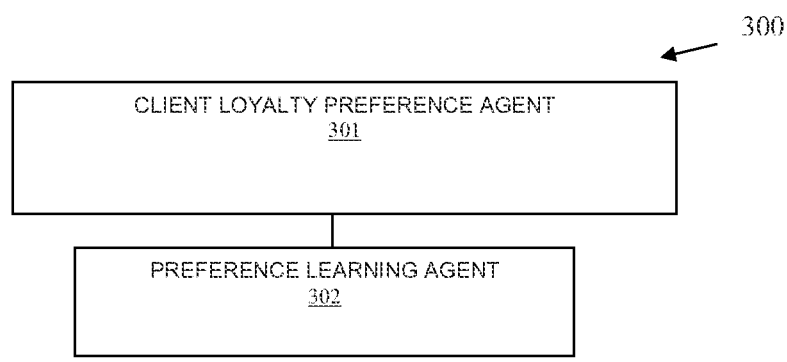
FIG. 3 is a diagram of a real-time customer preference learning system, according to an example embodiment.

FIG. 3 is a diagram of a real-time customer preference learning system 300, according to an example embodiment. The customer preference learning system 300 includes one or more processors that are specifically configured to perform, inter alia, the processing associated with the methods 100 and 200 of the FIGS. 1 and 2, respectively. Furthermore, the customer preference learning system 300 is operational over a network and the network can be wireless or a combination of wired and wireless. In an embodiment, the network is the Internet. In another case, the network is a cellular network. In yet another situation, the network is a satellite network. In still another case, the network is a Wi-Fi network, Bluetooth network, WAN, LAN, Ethernet network, or other type of network. It may also be that the network uses all or a combination of: the Internet, cellular network, Bluetooth network, Wi-Fi network, other type of network, and/or satellite network.

The customer preference learning system 300 includes a client loyalty preference agent 301 and a preference learning agent 302. Each of these and their interactions with one another will now be discussed in turn.

The client loyalty preference agent 301 is implemented, programmed, and resides within a non-transitory processor-readable storage medium and executes on a client device (first machine). Example processing associated with the client loyalty preference agent 301 was presented above in detail with respect to the FIG. 1.

The client loyalty preference agent 301 is configured to interact with a customer that is interacting with an enterprise via the first machine to capture actions taken and selections made by the customer. The client loyalty preference agent 301 is also configured to apply the actions and selections to the evaluation of predefined rules to determine when new preferences for the customer are to be made and to determine when updates to existing preferences are to be made based on interactions with the preference learning agent 302.

The preference learning agent 302 processes on a physical server machine or a Virtual Machine (VM) (second machine) and is operational over a network. That is, the preference learning agent 302 is implemented, resides, and programmed within a non-transitory processor-readable medium as executable instructions that a processor-enabled device executes. In some cases, the preference learning agent 302 is accessible via one or more cloud processing environments. Example processing associated with the preference learning agent 302 was presented above with reference to the FIG. 2.

The preference learning agent 302 is configured to receive the new preferences and the updates to the existing preferences and make them available in real time across disparate communication channels of an enterprise dynamically.

In an embodiment, the first machine is a mobile phone of the customer and the second machine is located in a cloud processing environment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on a device, which is configured to execute the method, comprising:
   identifying a customer engaging in an interaction with the device;
   obtaining predefined rules pertinent to preference determination for preferences of the customer, wherein some of all available preferences for the customer are unavailable based on a specific communication channel used by the customer;
   gathering actions of the customer during the interaction;
   feeding metrics for the actions to the predefined rules; and
   evaluating the predefined rules using the metrics to learn a new preference to assign to the customer or to update an existing preference value for an existing preference based on evaluation of the predefined rules.

2. The method of claim 1 further comprising, using loyalty rules with the new preference or the updated existing preference value to make a dynamic offer to the customer.

3. The method of claim 1 further comprising, dynamically updating an enterprise preference manager with the new preference or the updated existing preference value for distributing to any channel that the customer subsequently interacts through.

4. The method of claim 1, wherein identifying further includes processing the interaction on the device, where the device is one of: a self-service kiosk, an Automated Teller Machine (ATM), a mobile device of the customer, and a website portal server.

5. The method of claim 1, wherein identifying further includes obtaining at a start of the interaction a loyalty account for the customer, via one or more of: a loyalty scan of a loyalty card, manual entry of the loyalty account to the device, and/or identifying information scanned or entered that assists in automatically identifying the customer to the loyalty account.

6. The method of claim 1, wherein obtaining further includes requesting the predefined rules that are tied to the preference determinations via an Application Programming Interface (API) to a loyalty database.

7. The method of claim 1, wherein gathering further includes monitoring items purchased and selections made by the customer over a present communication channel that the customer is using to acquire the metrics for the actions.

8. The method of claim 1, wherein feeding further includes populating the metrics and existing preference values associated with the customer into variables defined in the predefined rules.

9. The method of claim 8 further comprising, acquiring the existing preference values from an enterprise preference manager.

10. The method of claim 8 further comprising, acquiring the existing preference values from a loyalty database agent that acquired the existing preference values on behalf of the method from an enterprise preference manager.

11. The method of claim 1, wherein evaluating further includes dynamically and in real time evaluating the predefined rules with the metrics before the interaction concludes with the customer.

12. The method of claim 1 further comprising, altering an existing offer that was to be presented to the customer based on the presence of the new preference or the updated existing preference value from the existing preference.

13. The method of claim 1 further comprising, providing another offer in addition to an existing offer to the customer before the interaction concludes based on the presence of the new preference or the updated existing preference value from the existing preference.

14. A processor-implemented method programmed in a non-transitory processor-readable medium and configured to execute on one or more processors, the method comprising:
receiving a request for preferences tied to a customer interacting with an enterprise;
acquiring the preferences from an enterprise preference manager, wherein some of all available preferences for the customer are unavailable based on a specific communication channel used by the customer;
delivering the preferences to a client loyalty preference agent interacting with the customer; and
receiving updates to the preferences in real time from the client loyalty preference agent based on actions taken by the customer when interacting with the client loyalty preference agent.

15. The method of claim 14, wherein receiving further includes receiving the request from the client loyalty preference agent, the device of the client loyalty preference agent is one of: a customer mobile device and an enterprise terminal device.

16. The method of claim 14, wherein receiving further includes receiving the request from an Application Programming Interface (API) of a loyalty database managed by the enterprise and in communication with the client loyalty preference agent.

17. The method of claim 14, wherein receiving further includes authenticating the request, the customer, and/or the client loyalty preference agent based on a policy before proceeding.

18. The method of claim 14 further comprising, generating trend reports for changes in the preferences obtained by mining the history of changes to the preferences.

19. A system, comprising:
a first machine having a client loyalty preference agent implemented in a non-transitory computer-readable storage medium and which processes on the first machine; and
a second machine having a preference learning agent implemented in a non-transitory computer-readable storage medium and which processes on the second machine;
the client loyalty preference agent configured to interact with a customer that is interacting with an enterprise via the first machine to capture actions taken and selections made by the customer, the client loyalty preference agent also configured to apply the actions and selections to the evaluation of predefined rules to determine when new preferences for the customer are to be made and to determine when updates to existing preferences are to be made, the preference learning agent is configured to receive the new preferences and the updates to the existing preferences and make them available in real time across disparate communication channels of an enterprise dynamically wherein some of all available preferences for the customer are unavailable based on a specific communication channel used by the customer.

20. The system of claim 19, wherein the first machine is a mobile phone of the customer and the second machine is located in a cloud processing environment.

* * * * *